United States Patent
Imamura

(10) Patent No.: US 9,368,811 B2
(45) Date of Patent: Jun. 14, 2016

(54) FUEL CELL SYSTEM AND MOVING BODY USING THE FUEL CELL SYSTEM

(75) Inventor: Tomonori Imamura, Nagoya (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 924 days.

(21) Appl. No.: 12/520,954

(22) PCT Filed: Dec. 26, 2007

(86) PCT No.: PCT/JP2007/075381
§ 371 (c)(1),
(2), (4) Date: Jun. 23, 2009

(87) PCT Pub. No.: WO2008/081977
PCT Pub. Date: Jul. 10, 2008

(65) Prior Publication Data
US 2010/0098979 A1    Apr. 22, 2010

(30) Foreign Application Priority Data
Dec. 27, 2006  (JP) ................... 2006-352272

(51) Int. Cl.
*H01M 8/04* (2006.01)
*B60L 1/00* (2006.01)
(Continued)

(52) U.S. Cl.
CPC ........... *H01M 8/04029* (2013.01); *B60L 1/003* (2013.01); *B60L 1/02* (2013.01);
(Continued)

(58) Field of Classification Search
CPC ............. H01M 8/04634; H01M 8/04671; H01M 8/04679; H01M 8/04029; H01M 8/04298; H01M 8/04313; H01M 8/0432; H01M 8/04641; H01M 8/04649; H01M 8/04962; H01M 8/04977; H01M 8/04992
USPC ................ 429/413–14, 430–34, 436–37, 450
See application file for complete search history.

(56) References Cited

U.S. PATENT DOCUMENTS 4,040,435 A * 8/1977 Elzinga .................... 429/463
4,075,504 A * 2/1978 Gnaedinger ................ 307/66
(Continued)

FOREIGN PATENT DOCUMENTS

| CA | 2555928 A1 | 8/2005 |
|---|---|---|
| CA | 2588889 A1 | 6/2006 |

(Continued)

OTHER PUBLICATIONS

JP 2002246054 A (English Translation).*
(Continued)

*Primary Examiner* — Scott J Chmielecki
(74) *Attorney, Agent, or Firm* — Kenyon & Kenyon LLP

(57) ABSTRACT

A fuel cell system includes a coolant pump for pumping a coolant, the coolant pump being provided in a coolant pipe that conveys the coolant to a fuel cell; a coolant heating device for heating the coolant when the fuel cell has stopped operation, the coolant heating device being provided in the coolant pipe; and a secondary battery for supplying power to the coolant pump and the coolant heating device, the secondary battery being connected to the coolant pump and the coolant heating device, wherein when the fuel cell has stopped operation, the heated coolant is conveyed to the fuel cell to dry the fuel cell. The fuel cell system further includes an external power source plug for supplying power from an external power source to the coolant pump and the coolant heating device, the external power source plug being connected to the coolant pump and the coolant heating device.

8 Claims, 1 Drawing Sheet

(51) Int. Cl.
*B60L 1/02* (2006.01)
*B60L 3/00* (2006.01)
*B60L 11/18* (2006.01)

(52) U.S. Cl.
CPC .......... *B60L 3/0053* (2013.01); *B60L 11/1816*
(2013.01); *B60L 11/1887* (2013.01); *B60L 11/1892* (2013.01); *B60L 11/1894* (2013.01);
*B60L 11/1898* (2013.01); *H01M 8/0432*
(2013.01); *H01M 8/04298* (2013.01); *H01M 8/04313* (2013.01); *H01M 8/04634* (2013.01);
*H01M 8/04641* (2013.01); *H01M 8/04649*
(2013.01); *H01M 8/04962* (2013.01); *H01M 8/04977* (2013.01); *H01M 8/04992* (2013.01);
*B60L 2240/662* (2013.01); *Y02E 60/50*
(2013.01); *Y02T 10/7072* (2013.01); *Y02T 10/7291* (2013.01); *Y02T 90/14* (2013.01);
*Y02T 90/16* (2013.01); *Y02T 90/34* (2013.01)

(56) References Cited

U.S. PATENT DOCUMENTS

| | | | |
|---|---|---|---|
| 2002/0009623 A1* | 1/2002 | St-Pierre | H01M 8/04007 429/414 |
| 2003/0020638 A1* | 1/2003 | Sari et al. | 340/995 |
| 2003/0162063 A1* | 8/2003 | Yoshizawa et al. | 429/24 |
| 2006/0029846 A1* | 2/2006 | Konoto | H01M 8/04082 429/415 |
| 2006/0073367 A1* | 4/2006 | Kanno | H01M 8/04007 429/413 |
| 2007/0190369 A1* | 8/2007 | Leach et al. | 429/9 |
| 2009/0286109 A1* | 11/2009 | Araki | 429/13 |
| 2010/0323261 A1* | 12/2010 | Igarashi | H01M 8/04029 429/436 |

FOREIGN PATENT DOCUMENTS

| | | | |
|---|---|---|---|
| JP | 2002-050378 A | | 2/2002 |
| JP | 2002050378 A | * | 2/2002 |
| JP | 2002-246054 A | | 8/2002 |
| JP | 2002246054 A | * | 8/2002 |
| JP | 2004-158333 A | | 6/2004 |
| JP | 2004-185968 A | | 7/2004 |
| JP | 2005-071626 A | | 3/2005 |
| JP | 2005071626 A | * | 3/2005 |
| JP | 2005-108832 A | | 4/2005 |
| JP | 2005-285347 A | | 10/2005 |
| JP | 2005-317410 A | | 11/2005 |
| JP | 2006-500733 A | | 1/2006 |
| JP | 2006-079864 A | | 3/2006 |

OTHER PUBLICATIONS

JP 2005071626 A (English Translation).*
JP 2002050378 A (English Translation).*
Office Action issued Sep. 27, 2011 in Japanese Patent Application No. 2006-352272 and English translation thereof.

* cited by examiner

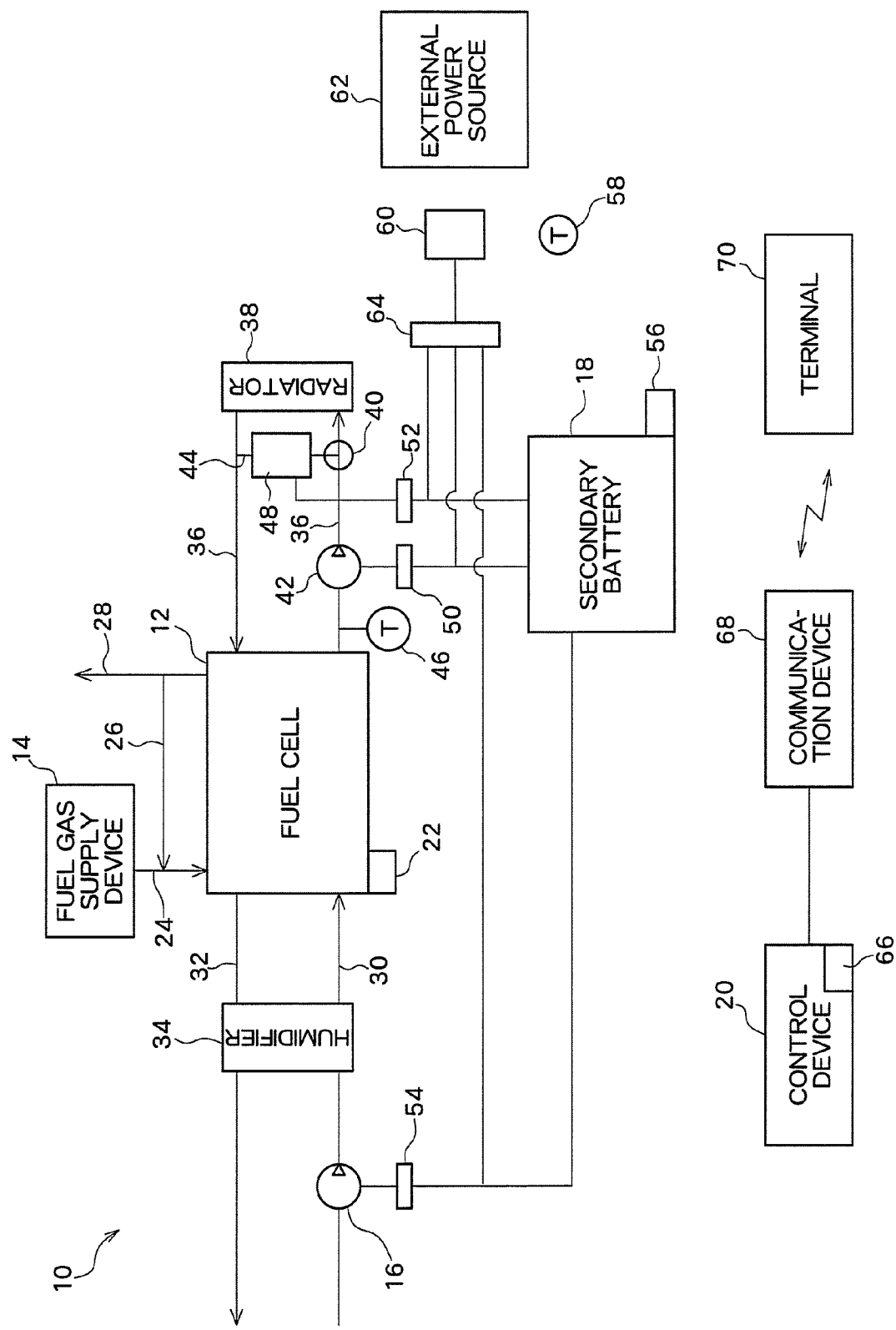

FUEL CELL SYSTEM AND MOVING BODY USING THE FUEL CELL SYSTEM

This is a 371 national phase application of PCT/JP2007/075381 filed 26 Dec. 2007, claiming priority to Japanese Patent Application No. JP 2006-352272 filed 27 Dec. 2006, the contents of which are incorporated herein by reference.

TECHNICAL FIELD

The present invention relates to a fuel cell system and a moving body incorporating the fuel cell system, and in particular, to a fuel cell system comprising a coolant pump for pumping a coolant, the coolant pump being provided in a coolant pipe that conveys the coolant to a fuel cell; heating means for heating the coolant when the fuel cell has stopped operation, the heating means being provided in the coolant pipe; and a secondary battery for supplying power to the coolant pump and the heating means, the secondary battery being connected to the coolant pump and the heating means, wherein when the fuel cell has stopped operation, the heated coolant is conveyed to the fuel cell to dry the fuel cell, and a moving body incorporating the fuel cell system.

BACKGROUND ART

Recently, fuel cells have been receiving attention as highly efficient and environmentally friendly cells. Fuel cells typically generate electrical energy by causing hydrogen serving as a fuel gas to electrochemically react with oxygen in the air serving as an oxidant gas. As a result of the electrochemical reaction between hydrogen and oxygen, water is produced.

There are different types of fuel cells, such as phosphoric acid fuel cells, molten carbonate fuel cells, solid oxide fuel cells, alkaline fuel cells, and polymer electrolyte fuel cells. Among these, attention has focused on fuel cell systems employing polymer electrolyte fuel cells, which are advantageous, for example, in that they can be started up at ordinary temperatures and quickly. Such fuel cell systems are used as a power source for vehicles or other moving bodies.

When a fuel cell system is operated under a low-temperature environment such as outdoors in cold climates, the produced water may freeze in a gas flow path or elsewhere within the fuel cell. For this reason, a drying process in which scavenging is performed by passing an oxidant gas or the like through the fuel cell such that water remaining in the fuel cell is discharged when the fuel cell has stopped operation, has been employed. For example, Japanese Patent Publication No. JP 2006-79864 A describes that scavenging is performed by passing a fuel gas or an oxidant gas through the fuel cell upon stoppage of electric power generation of the fuel cell such that remaining water is discharged from the fuel cell.

On the other hand, a drying process in which the fuel cell is warmed by heating a coolant using a heater or the like, and conveying the heated coolant to the fuel cell using a coolant pump after the fuel cell has stopped operation, has been employed. Here, the heater, the coolant pump, and the like are connected to a secondary battery (rechargeable battery), and power is supplied from the secondary battery. However, because the discharge capacity of a secondary battery is limited, the drying process of the fuel cell may fail to be sufficiently performed due to, for example, running out of remaining capacity halfway through the drying process.

DISCLOSURE OF INVENTION

Against the above-described background, an object of the present invention is to provide a fuel cell system capable of drying the fuel cell even when the remaining capacity of the secondary battery is insufficient.

According to one aspect of the present invention, there is provided a fuel cell system comprising a coolant pump for pumping a coolant, the coolant pump being provided in a coolant pipe that conveys the coolant to a fuel cell; heating means for heating the coolant when the fuel cell has stopped operation, the heating means being provided in the coolant pipe; and a secondary battery for supplying power to the coolant pump and the heating means, the secondary battery being connected to the coolant pump and the heating means, wherein when the fuel cell has stopped operation, the heated coolant is conveyed to the fuel cell to dry the fuel cell, the fuel cell system further comprising external power source connection means for supplying power from an external power source to the coolant pump and the heating means, the external power source connection means being connected to the coolant pump and the heating means.

According to another aspect of the present invention, it is preferable that the fuel cell system further comprises remaining capacity estimation means for estimating a remaining capacity of the secondary battery; determination means for determining the remaining capacity of the secondary battery estimated by the remaining capacity estimation means; and notification means for notifying that the external power source connection means is to be connected to the external power source when the determination means determines that the remaining capacity of the secondary battery is equal to or less than a predetermined capacity.

According to still another aspect of the present invention, there is provided a moving body incorporating a fuel cell system comprising a coolant pump for pumping a coolant, the coolant pump being provided in a coolant pipe that conveys the coolant to a fuel cell; heating means for heating the coolant when the fuel cell has stopped operation, the heating means being provided in the coolant pipe; and a secondary battery for supplying power to the coolant pump and the heating means, the secondary battery being connected to the coolant pump and the heating means, wherein when the fuel cell has stopped operation, the heated coolant is conveyed to the fuel cell to dry the fuel cell, the fuel cell system further comprising external power source connection means for supplying power from an external power source to the coolant pump and the heating means, the external power source connection means being connected to the coolant pump and the heating means.

According to still another aspect of the present invention, it is preferable that the moving body incorporates the fuel cell system further comprising remaining capacity estimation means for estimating a remaining capacity of the secondary battery; determination means for determining the remaining capacity of the secondary battery estimated by the remaining capacity estimation means; and notification means for notifying that the external power source connection means is to be connected to the external power source when the determination means determines that the remaining capacity of the secondary battery is equal to or less than a predetermined capacity.

As described above, by employing the fuel cell system according to the present invention, because power can be supplied from an external power source, it is possible to dry the fuel cell even when the remaining capacity of the secondary battery is insufficient.

BRIEF DESCRIPTION OF DRAWINGS

FIG. 1 shows a structure of a fuel cell system according to an embodiment of the present invention.

BEST MODE FOR CARRYING OUT THE INVENTION

An embodiment of the present invention will be described in detail below with reference to the drawing.

FIG. 1 shows a structure of a fuel cell system 10. The fuel cell system 10 includes a fuel cell 12, a fuel gas supply device 14 that supplies a fuel gas to the fuel cell 12, an oxidant gas supply device 16 that supplies an oxidant gas to the fuel cell 12, a secondary battery 18, and a control device 20.

The fuel cell 12 has the function of generating electric power through an electrochemical reaction between a fuel gas such as hydrogen and an oxidant gas such as oxygen. The fuel cell 12, such as, for example, the polymer electrolyte fuel cell 12, includes a stack which is formed by stacking a plurality of single cells. Here, a single cell is formed by providing catalyst layers respectively on both sides of an electrolyte membrane, and providing a gas diffusion layer on each of the catalyst layers, whereby a membrane electrode assembly is formed, and additionally providing a separator on the membrane electrode assembly. Further, by providing current collectors on both sides of such a stack, it is possible to collect electric current through the current collectors.

The electrolyte membrane has the function of moving hydrogen ions generated at the anode electrode side to reach the cathode electrode side, and other functions. As a material for the electrolyte membrane, a chemically stable fluorine-based resin, such as a perfluorocarbon sulfonic acid ion-exchange membrane, is used. As a perfluorocarbon sulfonic acid ion-exchange membrane, a membrane of Nafion (a registered trademark of DuPont) or the like may be used.

The catalyst layers have the function of accelerating an oxidation reaction of hydrogen at the anode electrode side, or a reduction reaction of oxygen at the cathode electrode side. The catalyst layers each include a catalyst and a catalyst carrier. In order to increase the active electrode area, the catalyst is typically used in the form of particles which are adhered to the catalyst carrier. For the catalyst, platinum-group elements such as platinum and the like having a low activation overvoltage with respect to an oxidation reaction of hydrogen or a reduction reaction of oxygen are used. For the catalyst carrier, carbon materials such as carbon black and the like are used.

The gas diffusion layer has the function of diffusing hydrogen serving as a fuel or oxygen serving as an oxidant across the catalyst layer, the function of moving electrons, and other functions. For the gas diffusion layer, carbon fiber woven fabric, carbon paper, and the like, which are electrically conductive materials, may be used. The membrane electrode assembly may be manufactured by, for example, stacking and heat-pressing the electrolyte membrane, the catalyst layers, and the gas diffusion layers.

The separator is stacked on the gas diffusion layer of the membrane electrode assembly, and has the function of separating hydrogen serving as a fuel gas and air serving as an oxidant for the adjacent single cells. Further, the separator has the function of electrically connecting between one single cell and another single cell. The separator may be formed by, for example, pressing a sheet of titanium, a sheet of stainless steel, or the like.

A resistance measurement device 22 has the function of measuring an internal resistance (impedance) of the fuel cell 12, and is provided on the fuel cell 12, for example. The more water remains in the fuel cell 12, the lower the resistance value. The less water remains in the fuel cell 12, the higher the resistance value. Thus, by measuring the resistance value of the fuel cell 12, it is possible to estimate how dry the fuel cell 12 is. Resistance value data measured by the resistance measurement device 22 is transmitted to the control device 20.

A fuel gas supply system of the fuel cell system 10 includes the fuel gas supply device 14 for supplying a fuel gas such as hydrogen to the fuel cell 12, a fuel gas supply pipe 24 for conveying the fuel gas to the anode of the fuel cell 12, and a fuel gas circulation pipe 26 for circulating the fuel gas exhausted from the anode of the fuel cell 12 to the fuel gas supply pipe 24.

The fuel gas supply device 14 is formed by, for example, a high-pressure tank, a hydrogen storage alloy, a reformer, and the like. The fuel gas supply pipe 24 is provided with a shutoff valve that controls supply and stop of the fuel gas from the fuel gas supply device 14, a pressure sensor that detects the pressure of the fuel gas, a pressure regulating valve that regulates the pressure of the fuel gas, a shutoff valve that opens and closes a fuel gas supply port of the fuel cell 12, and the like.

The fuel gas circulation pipe 26 is provided with a shutoff valve that discharges the fuel gas, a pressure sensor that detects the pressure of the fuel gas, a circulating pump that is driven by a motor, a nonreturn valve that prevents the fuel gas in the fuel gas supply pipe 24 from reversely flowing into the fuel gas circulation pipe 26, and the like. Based on control of a control section, the circulating pump compresses the fuel gas whose pressure has dropped when it passes through the anode of the fuel cell 12, to increase the gas pressure to an appropriate level, and returns the fuel gas to the fuel gas supply pipe 24. The fuel gas merges with the fuel gas supplied from the fuel gas supply device 14 through the fuel gas supply pipe 24, and is supplied to the fuel cell 12 for reuse. Further, the fuel gas containing an increased concentration of impurities due to repeated circulation through the fuel cell 12 is exhausted through a fuel gas exhaust pipe 28.

An oxidant gas supply system of the fuel cell system 10 includes the oxidant gas supply device 16 that supplies compressed air as an oxidant gas, an oxidant gas supply pipe 30 that has the function of conveying the oxidant gas to the cathode of the fuel cell 12, and an oxidant gas exhaust pipe 32 that has the function of exhausting the oxidant gas exhausted from the cathode of the fuel cell 12.

The oxidant gas supply device 16 includes an air pump or an air compressor that is driven by a motor, and functions as pumping means for pumping the oxidant gas. Further, the air pump or the air compressor is provided with, for example, an air filter that removes dust particles or the like contained in the air introduced from the atmosphere. The oxidant gas supply pipe 30 or the oxidant gas exhaust pipe 32 is provided with, for example, a pressure sensor that detects the pressure of the oxidant gas, and a pressure regulating valve that has the function of regulating the pressure of the oxidant gas at the cathode.

A humidifier 34 is provided between the fuel cell 12 and the oxidant gas supply device 16, and has the function of exchanging moisture between an oxidant gas that has been brought into a high-humidity condition due to water produced as a result of the electrochemical reaction in the fuel cell 12 and a low-humidity oxidant gas introduced from the atmosphere. Thus, the humidifier 34 can humidify the low-humidity oxidant gas introduced from the atmosphere.

A coolant system of the fuel cell system 10 is provided with, for example, a coolant pipe 36 that conveys a coolant to the fuel cell 12 for circulation therein, a radiator 38 that radiates heat of the coolant to the outside, a coolant amount regulator valve 40 that regulates the amount of the coolant flowing into the radiator 38, and a coolant pump 42 that pressurizes and pumps the coolant. Further, the coolant pipe 36 is provided with a bypass pipe 44 in parallel with the radiator 38 in order to reduce the amount of coolant flowing into the radiator 38.

The coolant amount regulator valve 40 has the function of regulating the amount of coolant flowing into the radiator 38, and is provided in the coolant pipe 36. To cool the fuel cell 12, the amount of coolant flowing into the radiator 38 is increased based on control of the control device 20, and the coolant cooled by the radiator 38 can be supplied to the fuel cell 12. On the other hand, to warm the fuel cell 12, the coolant amount regulator valve 40 is switched based on control of the control device 20 to allow the coolant to flow through the bypass pipe 44, which is provided in parallel with the radiator 38, so that the amount of coolant flowing into the radiator 38 can be reduced. For the coolant amount regulator valve 40, for example, a three-way valve or the like may be used.

A coolant temperature sensor 46 is provided in the coolant pipe 36 on the side from which the coolant is discharged, and has the function of measuring the temperature of the coolant discharged from the fuel cell 12. Thus, by measuring the temperature of the coolant discharged from the fuel cell 12, it is possible to estimate the temperature in the fuel cell 12. For the coolant temperature sensor 46, a typical thermometer, a thermocouple, or the like may be used. Coolant temperature data measured by the coolant temperature sensor 46 is transmitted to the control device 20.

A coolant heating device 48 functions as heating means for heating the coolant while the fuel cell 12 is not operating, and is provided in the bypass pipe 44, or elsewhere in the coolant pipe 36. By pumping the coolant heated by the coolant heating device 48 to the fuel cell 12 using the coolant pump 42, it is possible to warm the fuel cell 12. For the coolant heating device 48, for example, a resistance heating type heater or the like may be used.

The secondary battery 18 is connected to the coolant pump 42 and the coolant heating device 48, and has the function of supplying power to the coolant pump 42 and the coolant heating device 48. For the secondary battery 18, for example, a lead-acid battery, a nickel-metal hydride battery, a lithium-ion battery, or the like may be used. It is to be understood that the secondary battery 18 is not limited to secondary batteries of the types described above. An inverter 50, a chopper control circuit 52, or the like is provided either between the secondary battery 18 and the coolant pump 42, or between the secondary battery 18 and the coolant heating device 48.

Further, the secondary battery 18 may be connected to the oxidant gas supply device 16 to supply power to the oxidant gas supply device 16. Then, an inverter 54 or the like is provided between the secondary battery 18 and the oxidant gas supply device 16. By allowing an oxidant gas to flow through the fuel cell 12 during warm-up of the fuel cell 12 using the heated coolant, it is possible to discharge water remaining in the fuel cell 12 in a further improved manner during a drying process. Further, the secondary battery 18 may be connected to a motor via an inverter to be used as an auxiliary power source for the fuel cell 12.

A battery remaining capacity meter 56 functions as remaining capacity estimation means for estimating the remaining capacity of the secondary battery 18, and is provided on, for example, the secondary battery 18. For the battery remaining capacity meter 56, for example, a battery remaining capacity meter which estimates the remaining capacity of the secondary battery by measuring either the specific gravity of a liquid electrolyte used in the secondary battery 18 or the voltage of the secondary battery 18 may be used. Remaining capacity data of the secondary battery 18 which is estimated is transmitted to the control device 20.

An outside-air temperature sensor 58 functions as temperature measurement means for measuring the temperature of outside air. For the outside-air temperature sensor 58, a typical thermometer, a thermocouple, or the like may be used. Outside-air temperature data measured by the outside-air temperature sensor 58 is transmitted to the control device 20.

An external power source plug 60 is connected to the coolant pump 42 and the coolant heating device 48, and functions as external power source connection means capable of supplying power from an external power source 62 to the coolant pump 42 and the coolant heating device 48. By connecting the external power source plug 60 to the external power source 62, it is possible to supply power from the external power source 62 to the coolant pump 42 and the coolant heating device 48. The external power source connection means is not limited to plugs but may be a connector or the like. Further, when an alternating-current power supply such as a household power supply is used as the external power source 62, a converter 64 is provided at a location which is between the external power source plug 60 and the coolant pump 42, and between the external power source plug 60 and the coolant heating device 48. It is to be understood that the external power source 62 is not limited to alternating-current power supplies, and a direct-current power supply may be used.

Further, the external power source plug 60 may be connected to the oxidant gas supply device 16 so that power can be supplied from the external power source 62 to the oxidant gas supply device 16. By connecting the external power source plug 60 to the external power source 62, it is possible to supply power from the external power source 62 to the oxidant gas supply device 16. Thus, because power can be supplied from the external power source 62 to the coolant pump 42, the coolant heating device 48, and the oxidant gas supply device 16, by allowing an oxidant gas to flow through the fuel cell 12 during warm-up of the fuel cell 12 using the heated coolant, it is possible to discharge water remaining in the fuel cell 12 in a further improved manner during a drying process.

The control device 20 is constructed as a microcomputer including therein a CPU, a RAM, and a ROM, and controls the operation of each section of the fuel cell system 10 in accordance with a program stored in the ROM. The control device 20 receives sensor signals from the temperature sensors and the pressure sensors provided for the pipes, drives the motors in accordance with the condition of operation of the cell (for example, power load) to adjust the numbers of revolutions of the coolant pump 42 and the like, and also, for example, controls the various types of valves to open or close, or adjusts the valve open amounts. The control device 20 is connected to the pumps, the sensors, and the valves by means of, for example, electric cables which are not shown in the drawing.

A determination section 66 functions as determination means for determining the remaining capacity of the secondary battery 18 estimated by the battery remaining capacity meter 56, and is provided in the control device 20. The determination section 66 is capable of determining whether or not the remaining capacity of the secondary battery 18 is a capacity equal to or less than a predetermined capacity by comparing the remaining capacity of the secondary battery 18 estimated by the battery remaining capacity meter 56 with the predetermined capacity which is set beforehand. Further, the determination section 66 may have the function of determining the resistance value of the fuel cell 12 measured by the resistance measurement device 22. The determination section 66 is capable of determining whether or not the measured resistance value is a resistance value equal to or less than a predetermined resistance value by comparing the resistance value data transmitted from the resistance measurement device 22 with the predetermined resistance value which is set beforehand. Further, the determination section 66 may have the function of determining the outside-air temperature measured by the outside-air temperature sensor 58. The determination section 66 is capable of determining whether or not the outside-air temperature is a temperature equal to or less than a predetermined temperature by comparing the outside-air temperature data transmitted from the outside-air temperature sensor 58 with the predetermined temperature which is set beforehand. Further, the determination section 66 may have the function of determining the temperature of the coolant discharged from the fuel cell 12 which is measured by the coolant temperature sensor 46. The determination section 66 is capable of determining whether or not the coolant temperature is a temperature equal to or less than a predetermined temperature by comparing the coolant temperature data transmitted from the coolant temperature sensor 46 with the predetermined temperature which is set beforehand. The control device 20 is capable of transmitting results of determination of the remaining capacity of the secondary battery 18, the resistance value of the fuel cell 12, the outside-air temperature, and the coolant temperature to a communication device 68 which will be described below.

The communication device 68 functions as notification means for notifying the vehicle user or the like that the external power source plug 60 should be connected to the external power source 62 when the control device 20 determines that the remaining capacity of the secondary battery 18 is equal to or less than the predetermined capacity. The communication device 68 is capable of causing a message such as "To avoid the fuel cell system from freezing, please connect the external power source plug to an external power source" to be displayed on a display screen of a terminal 70 such as a keyless entry device or a navigation device to notify the vehicle user or the like that they should connect the external power source plug 60 to the external power source 62.

Next, an operation of the fuel cell system 10 as described above will be described.

After the fuel cell 12 has stopped operation during a stop of the vehicle, the determination section 66 provided in the control device 20 determines whether or not a resistance value of the fuel cell 12 transmitted from the resistance measurement device 22 is a resistance value equal to or less than a predetermined resistance value. Further, the determination section 66 determines whether or not outside-air temperature data transmitted from the outside-air temperature sensor 58 is a temperature equal to or less than a predetermined temperature. When the resistance value of the fuel cell 12 is equal to or less than the predetermined resistance value, and the outside-air temperature is equal to or less than the predetermined temperature, the fuel cell system 10 performs a drying process for the fuel cell 12 because water remaining in the fuel cell 12 may freeze. Here, the determination section 66 may determine whether or not, instead of an outside-air temperature, a coolant temperature transmitted from the coolant temperature sensor 46 is a temperature equal to or less than a predetermined temperature. Further, when the coolant temperature is equal to or less than the predetermined temperature, the fuel cell system 10 performs a drying process for the fuel cell 12 because water remaining in the fuel cell 12 may freeze.

The determination section 66 determines whether or not the remaining capacity of the secondary battery 18 is a capacity equal to or less than a predetermined capacity by comparing the remaining capacity of the secondary battery 18 estimated by the battery remaining capacity meter 56 with the predetermined capacity which is set beforehand. When the remaining capacity of the secondary battery 18 is greater than the predetermined capacity, power is supplied from the secondary battery 18 to the coolant pump 42 and the coolant heating device 48. Then, the coolant heated by the coolant heating device 48 is pumped by the coolant pump 42, and conveyed to the fuel cell 12 through the coolant pipe 36. The fuel cell 12 is warmed by the heated coolant to perform a drying process. Further, when the secondary battery 18 and the oxidant gas supply device 16 are connected, power is supplied from the secondary battery 18 to the oxidant gas supply device 16. Then, an oxidant gas is conveyed to the fuel cell 12, and by using an oxidant gas to expel water remaining in the fuel cell 12, the drying process for the fuel cell 12 is further improved.

When the determination section 66 determines that the remaining capacity of the secondary battery 18 is equal to or less than the predetermined capacity, the control device 20 transmits a result of determination to the communication device 68. The communication device 68 which has received the result of determination from the control device 20 provides a notification to, for example, a keyless entry device of a vehicle user, indicating that the external power source plug 60 should be connected to the external power source 62. The communication device 68 causes a message such as, for example, "To prevent freezing, please connect the external power source plug to an external power source" to be displayed on a display screen of a keyless entry device or the like. In response, the vehicle user connects the external power source plug 60 to the external power source 62.

After the external power source plug 60 is connected to the external power source 62, power is supplied from the external power source 62 to the coolant pump 42 and the coolant heating device 48. Then, the coolant heated by the coolant heating device 48 is pumped by the coolant pump 42, and conveyed to the fuel cell 12 through the coolant pipe 36. The fuel cell 12 is warmed by the heated coolant to perform a drying process. Further, when the external power source plug 60 and the oxidant gas supply device 16 are connected, power is supplied from the external power source 62 to the oxidant gas supply device 16. An oxidant gas is conveyed to the fuel cell 12, and by using an oxidant gas to expel water remaining in the fuel cell 12, the drying process for the fuel cell 12 is further improved.

The determination section 66 determines whether or not the resistance value transmitted from the resistance measurement device 22 is greater than the predetermined resistance value which is set beforehand. When the resistance value is equal to or less than the predetermined resistance value, the fuel cell system 10 continues the drying process based on the determination that the fuel cell 12 is not sufficiently dried. When the resistance value is greater than the predetermined resistance value, the fuel cell system 10 terminates the drying process based on the determination that the fuel cell 12 is sufficiently dried.

It should be noted that even when it is determined that the remaining capacity of the secondary battery 18 is greater than the predetermined capacity, a vehicle user may connect the external power source plug 60 to the external power source 62 to allow power to be supplied from the external power source 62 to the coolant pump 42, the coolant heating device 48, and the oxidant gas supply device 16. Further, moving bodies incorporating the above-described fuel cell system 10 are not limited to automobiles but may be any moving bodies such as ships or aircraft.

With the above-described structure, because the external power source plug is connected to the external power source to thereby allow power to be supplied from the external power source to the coolant pump, the coolant heating device, and the oxidant gas supply device, the drying process of the fuel cell can be performed even when the remaining capacity of the secondary battery is insufficient.

With the above-described structure, because the fuel cell system includes the battery remaining capacity meter that estimates a remaining capacity of the secondary battery, the determination section that has the function of determining the remaining capacity of the secondary battery estimated by the battery remaining capacity meter, and the communication device that, when the determination section determines that the remaining capacity of the secondary battery is equal to or less than the predetermined capacity, provides a notification indicating that the external power source plug should be connected to the external power source, a vehicle user can recognize that the remaining capacity of the secondary battery is insufficient, and can connect the external power source plug to the external power source to enable the drying process of the fuel cell.

INDUSTRIAL APPLICABILITY

The fuel cell system according to the present invention is useful for any applications in which a fuel cell is used, but can be especially applied to fuel cells for use in vehicles.

The invention claimed is:

1. A fuel cell system, the fuel cell system comprising:
   a coolant pump for pumping a coolant, the coolant pump being provided in a coolant pipe that conveys the coolant to a fuel cell;
   a heating device for heating the coolant when the fuel cell has stopped operation; and
   a secondary battery for supplying power to at least one of the coolant pump and the heating device, the secondary battery being connected to at least one of the coolant pump and the heating device, wherein
   the fuel cell system further comprising:
   an external power source connection device for supplying power from an external power source to the coolant pump and the heating device, the external power source connection device being connected to the coolant pump and the heating device through a plug and converter;
   a remaining capacity estimation device configured to estimate a remaining capacity of the secondary battery;
   an internal resistance measurement device configured to measure an internal resistance of the fuel cell;
   an outside-air temperature measurement device configured to measure an outside-air temperature;
   a control device programmed to determine the remaining capacity of the secondary battery estimated by the remaining capacity estimation device after the fuel cell has stopped operation and programmed to determine whether a drying process is to be performed when the internal resistance of the fuel cell is equal to or less than a predetermined resistance and the outside-air temperature is equal to or less than a predetermined temperature;
   wherein the control device is programmed to cause the heated coolant to be conveyed to the fuel cell when the fuel cell has stopped operation, the internal resistance of the fuel cell is equal to or less than a predetermined resistance, and the outside-air temperature is equal to or less than a predetermined temperature;
   wherein the control device is programmed to transmit a signal to a notification device when the control device determines that the remaining capacity of the secondary battery is equal to or less than a predetermined capacity and the drying process is to be performed,
   wherein the device is programmed to continue the drying process of the fuel cell when the internal resistance of the fuel cell is equal to or less than the predetermined resistance value and to allow power to be supplied from the external power source to the coolant pump and the heating device during the drying process when the control device determines that the remaining capacity of the secondary battery is equal to or less than a predetermined capacity after the fuel cell operation has stopped,
   wherein the control device is programmed to terminate the drying process of the fuel cell when the internal resistance of the fuel cell is greater than the predetermined resistance value, and
   wherein the external power source is an alternating-current power source.

2. The fuel cell system according to claim 1, further comprising:
   the control device is further capable of determining the outside-air temperature measured by the outside-air temperature measurement device, and
   when the control device determines that the outside-air temperature is equal to or less than a predetermined temperature, the heated coolant is conveyed to the fuel cell to dry the fuel cell.

3. The fuel cell system according to claim 1, further comprising:
   a coolant measurement device for measuring a coolant temperature of the coolant discharged from the fuel cell, wherein
   the control device further is of determining the coolant temperature measured by the coolant measurement device, and
   when the control device determines that the coolant temperature is equal to or less than a predetermined temperature, the heated coolant is conveyed to the fuel cell to dry the fuel cell.

4. A moving body incorporating the fuel cell system as recited in claim 1.

5. A moving body incorporating the fuel cell system as recited in claim 2.

6. A moving body incorporating the fuel cell system as recited in claim 3.

7. The fuel cell system according to claim 1, wherein the notification device is a keyless entry device.

8. The fuel cell system according to claim 7, wherein the keyless entry device has a display on which a notification message is displayed.

* * * * *